(12) United States Patent
Patel et al.

(10) Patent No.: US 12,479,730 B1
(45) Date of Patent: Nov. 25, 2025

(54) HOMOGENOUS, PARTIALLY OXIDIZED CARBON AND MICROWAVE-ASSISTED METHODS OF MAKING THE SAME

(71) Applicant: Lyten, Inc., San Jose, CA (US)

(72) Inventors: Parth Kailas Patel, Newark, CA (US); Beomseok Kim, Hayward, CA (US); Lisseth Gavilan, San Carlos, CA (US); Chiapu Chang, Saratoga, CA (US)

(73) Assignee: LYTEN, INC., San Jose, CA (US)

( * ) Notice: Subject to any disclaimer, the term of this patent is extended or adjusted under 35 U.S.C. 154(b) by 0 days.

(21) Appl. No.: 18/965,834

(22) Filed: Dec. 2, 2024

(51) Int. Cl.
| | | |
|---|---|---|
| C01B 32/198 | (2017.01) | |
| C01B 32/05 | (2017.01) | |
| C01B 32/18 | (2017.01) | |
| C01B 32/194 | (2017.01) | |

(52) U.S. Cl.
CPC ............ *C01B 32/198* (2017.08); *C01B 32/05* (2017.08); *C01B 32/18* (2017.08); *C01B 32/194* (2017.08); *C01P 2002/60* (2013.01); *C01P 2002/82* (2013.01); *C01P 2002/85* (2013.01); *C01P 2006/40* (2013.01)

(58) Field of Classification Search
None
See application file for complete search history.

(56) References Cited

U.S. PATENT DOCUMENTS

| | | | |
|---|---|---|---|
| 9,758,379 B2 | 9/2017 | Blair | |
| 10,519,040 B2 | 12/2019 | Bozalina et al. | |
| 11,289,577 B2 | 3/2022 | Berry et al. | |
| 2015/0274531 A1* | 10/2015 | Yoon | ...................... C01B 32/23 549/519 |
| 2017/0027168 A1 | 2/2017 | Heath | |
| 2019/0039907 A1* | 2/2019 | Zeng | ..................... C01B 32/198 |

FOREIGN PATENT DOCUMENTS

| | | | |
|---|---|---|---|
| CN | 104386677 A | * | 3/2015 |
| IN | 553462 B | | 10/2024 |

OTHER PUBLICATIONS

English machine translation of Qian et al. (CN 104386677 A); PDF pp. 1-10 accessed online from Espacenet. (Year: 2015).*

(Continued)

*Primary Examiner* — Katie L. Hammer
(74) *Attorney, Agent, or Firm* — Zilka-Kotab, P.C.

(57) ABSTRACT

Partially oxidized carbonaceous materials characterized by substantially homogenous, partially oxygenated surfaces thereof are enabled via microwave-assisted methods that are simple and fast. The exemplary methods include combining carbonaceous material(s), at least one mild oxidizer, at least one nucleophile, and an aqueous solvent system to obtain a mixture; and exposing the mixture to microwave radiation for a predetermined time to produce partially oxidized carbonaceous materials. The predetermined time may be in a range from about 5 seconds to about 2 hours, and the power of the microwave energy may be in a range from about 100 w to about 1700 W. The partially oxidized carbonaceous materials are characterized by a homogeneous distribution of oxygen content in surfaces thereof, in non-zero amounts up to about 10 at %, and a standard deviation of surface oxygen content in a range from about 0.1 at % to about 1.0 at %.

16 Claims, 3 Drawing Sheets

(56) References Cited

OTHER PUBLICATIONS

Mao et al., "Microwave-Assisted Oxidation of Electrospun Turbostratic Carbon Nanofibers for Tailoring Energy Storage Capabilities," with Supporting Infomation, Chemistry of Materials, vol. 27, Jul. 2015, 30 pages.
Menendez et al., "Modification of the surface chemistry of active carbons by means of microwave-induced treatments," Carbon, vol. 37, 1999, pp. 1115-1121.
Xie et al., "Advances in Microwave-Assisted Production of Reduced Graphene Oxide," Frontiers in Chemistry, vol. 7, Jun. 2019, pp. 1-11.
Menendez et al., "Microwave heating processes involving carbon materials," Fuel Processing Technology, vol. 91, 34 pages.
Viana et al., "Facile Graphene Oxide Preparation by Microwave-Assisted Acid Method," Journal of the Brazilian Chemical Society, vol. 26, No. 5, 2015, pp. 978-984.
Al-Hazmi et al., "One pot synthesis of graphene based on microwave assisted solvothermal technique," Synthetic Metals, vol. 200, 2015, pp. 54-57.
Xiao et al., "Microwave assisted one-step green synthesis of fluorescent carbon nanoparticles from ionic liquids and their application as novel fluorescence probe for quercetin determination," Journal of Luminescence, vol. 140, Aug. 2013, pp. 120-125.
Glowniak et al., "Advances in Microwave Synthesis of Nanoporous Materials," Advanced Materials, Sep. 27, 2021, pp. 1-28.
Georgakilas et al., "Broad Family of Carbon Nanoallotropes: Classification, Chemistry, and Applications of Fullerenes, Carbon Dots, Nanotubes, Graphene, Nanodiamonds, and Combined Superstructures," ACS Chemical Reviews, vol. 115, May 27, 2015, pp. 4744-4822.
Zhu et al., "Microwave-Assisted Preparation of Inorganic Nanostructures in Liquid Phase," Chemical Reviews, vol. 114, 2014, pp. 6462-6555.
Zhu et al., "Microwave assisted exfoliation and reduction of graphite oxide for ultracapacitors," Carbon, vol. 48, Jun. 2010, 4 pages.
Saika et al., "Oxidative chemical beneficiation of low-quality coals under low-energy ultrasonic and microwave irradiation: An environmental-friendly approach," Journal of Environmental Chemical Engineering, Nov. 26, 2020, pp. 1-11.
Hummers et al., "Preparation of Graphitic Oxide," Journal of the American Chemical Society, Mar. 20, 1958, 1 page, retrieved from https://www.semanticscholar.org/paper/Preparation-of-Graphitic-Oxide-Hummers-Offeman/6ea731bbebc977f9a0fde11327a2bd5e01a8d691.
Limosani et al., "Top-Down N-Doped Carbon Quantum Dots for Multiple Purposes: Heavy Metal Detection and Intracellular Fluorescence," Nanomaterials, vol. 11, 2021, pp. 1-14.
Ibarra-Hernandez et al., "Synthesis of Graphite Oxide with Different Surface Oxygen Contents Assisted Microwave Radiation," Nanomaterials, vol. 8, 2018, pp. 1-17.
Yu et al., "High-efficient Synthesis of Graphene Oxide Based on Improved Hummers Method," Scientific Reports, Nov. 3, 2016, pp. 1-7.
Marcano et al., "Improved Synthesis of Graphene Oxide," ACS Nano, vol. 4, No. 8, Jul. 22, 2010, pp. 4806-4814.
Kiani et al., "Green Oxidation of Carbon Black by Dry Ball Milling," ACS Sustainable Chemical Engineering, vol. 10, 2022, pp. 16019-16026.
Chen et al., "Modification of Carbon Black with Hydrogen Peroxide for High Performance Anode Catalyst of Direct Methanol Fuel Cells," Materials, vol. 14, 2021, pp. 1-13.
Tene et al., "Toward Large-Scale Production of Oxidized Graphene," Nanomaterials, vol. 10, 2020, pp. 1-11.
Zaaba et al., "Synthesis of Graphene Oxide using Modified Hummers Method: Solvent Influence," Procedia Engineering, vol. 184, 2017, pp. 469-477.
Peng et al., "Microwave-assisted metallurgy," Sage Journals, vol. 60, Jan. 2015, 1 page, Abstract only.
Yoshida et al., "Microwave-assisted chemical modification of carbon nanohorns: Oxidation and Pt deposition," Chemical Physics Letters, vol. 433, Dec. 29, 2006, pp. 97-100.

\* cited by examiner

HOMOGENOUS, PARTIALLY OXIDIZED CARBON AND MICROWAVE-ASSISTED METHODS OF MAKING THE SAME

FIELD OF INVENTION

The present disclosure relates to partially oxidized carbonaceous materials and corresponding oxidation methods, and more particularly to carbonaceous materials produced using a microwave-assisted method for achieving reproducible partial oxidation of carbon, resulting in homogeneous, partially oxidized carbonaceous materials.

BACKGROUND

Carbon oxidation is a widely used process for modifying the surface properties and functionality of carbonaceous materials. Oxidized carbonaceous materials find applications in various fields including composites, sensors, energy storage, and catalysis. Traditional methods for carbon oxidation often involve wet chemical techniques such as the Hummers method, which uses strong oxidizing agents and acids to introduce oxygen-containing functional groups onto the carbon surface.

While effective in achieving high degrees of oxidation, conventional wet oxidation methods typically suffer from several drawbacks. These processes can be time-consuming, often requiring hours to days to complete. Additionally, they frequently utilize harsh and corrosive reagents that necessitate complex cleanup procedures and generate hazardous waste streams. Perhaps most significantly, traditional oxidation techniques often struggle to produce consistent and homogeneous results, with the degree of oxidation varying considerably both within a single batch and between different batches.

Moreover, conventional techniques such as wet oxidation tend to produce highly oxidized carbonaceous materials, e.g., having a surface oxygen content in a range from about 30-40 at % and high variability characterized by a standard deviation in surface oxygen content in a range from about 5 at % to about 30 at %, and accordingly are unsuitable for producing partially oxidized carbonaceous materials, e.g., having a surface oxygen content in a range from 1-10 at % particularly for producing homogenously oxidized carbonaceous materials. Achieving partial oxidation is a particular challenge because the oxidation process is difficult to control, especially using traditional techniques. Slight variations in temperature, reagent amounts, and reaction time cause substantial differences in the amount of oxidation, which tends to react to completion, resulting in the much higher surface oxygen content and variability in surface oxygen content as observed in oxidized carbonaceous materials produced using wet oxidation and other conventional techniques.

The lack of reproducibility and homogeneity in carbon oxidation presents challenges for many applications that require precise control over surface chemistry and properties. Variations in oxidation levels can lead to inconsistent performance in end products, complicating quality control and potentially limiting the utility of oxidized carbonaceous materials in sensitive applications like sensors or electronic devices.

There is a general need in the field for improved carbon oxidation methods that can achieve more uniform and reproducible results. Ideally, such methods would also offer advantages in terms of processing time, reagent selection, and overall simplicity compared to conventional techniques. Advancements in this area could potentially expand the use of partially oxidized carbonaceous materials across a range of industries and applications.

SUMMARY

This summary is provided to introduce a selection of concepts in a simplified obtain that are further described below in the detailed description. This summary is not intended to identify key features or essential features of the claimed subject matter, nor is it intended to be used as an aid in determining the scope of the claimed subject matter.

According to an aspect of the present disclosure, a method for partially oxidizing carbon is provided. The method includes combining a carbon source, a mild oxidizer, a base or nucleophile, and a solvent (and optionally, cosolvent) to obtain a mixture. The method further includes exposing the mixture to microwave radiation for a predetermined time to produce partially oxidized carbon. The partially oxidized carbon has a homogeneous distribution of oxygen content and a reproducible degree of oxidation.

According to other aspects of the present disclosure, the method may include one or more of the following features. The mild oxidizer may include hydrogen peroxide. The base may include ammonium hydroxide. The solvent may include water. The cosolvent may include one or more water miscible green solvents that are polar protic and/or polar aprotic solvents, such as ethanol, isopropanol, acetone, acetonitrile, etc. Accordingly, the presently disclosed inventive concepts are characterized by avoiding the use of strong acids such as sulfuric acid, harsh reagents such as potassium permanganate, potassium chlorate, sodium nitrate, sodium nitrite, sodium nitride, and other undesirable reagents typically utilized in wet oxidation techniques such as the Hummer's method. Preferably, all reagents (excepting the carbon source and resulting partially oxidized carbonaceous materials) used in fabricating partially oxidized carbonaceous materials according to the presently disclosed inventive techniques break down into environmentally harmless byproducts, such as water, ammonia, and oxygen. Moreover, according to select implementations the predetermined time may be in a range from about 5 seconds to about 2 hours, preferably about 15 minutes. The method may further include filtering, centrifuging, washing, etc. the partially oxidized carbon. Advantageously, the method is simple and may be performed quickly and safely, including only three steps (mixing reagents, exposing to microwave radiation, and collection) and avoiding risk of combustion as is associated with conventional wet oxidation techniques such as the Hummer's method.

According to another aspect of the present disclosure, a partially oxidized carbon product is provided. The partially oxidized carbon product is produced by a process including combining carbon, a mild oxidizer, a base or nucleophile, a solvent, and optionally a cosolvent to obtain a mixture. The process further includes exposing the mixture to microwave radiation for a predetermined time. The partially oxidized carbon may be collected using a filtration technique, such as vacuum filtration, centrifuging, and optionally washing the partially oxidized carbon product, e.g. with water. Washing advantageously removes unreacted reagents from the bulk partially oxidized carbonaceous material, according to select approaches.

According to other aspects of the present disclosure, the partially oxidized carbon products may include one or more of the following features. The resulting partially oxidized carbon may have a surface oxygen content of about 4 at % to about 7 at %. The partially oxidized carbon may have a substantially homogenous distribution of surface oxygen, as indicated by having a standard deviation of surface oxygen content in a range from about 0.1 at % to about 1.0 at %, preferably less than about 0.5 at %. The surface oxygen content may have a coefficient of variance in a range from about 1.0 at % to about 10 at %. The partially oxidized carbon product may include allotropes selected from the group consisting of graphene, three-dimensional graphene, carbon nano-onions (CNOs), graphene flakes, graphene platelets, carbon fibers, fullerenes, carbon nanotubes (CNTs), single walled carbon nanotubes (SWCNTs), multi walled carbon nanotubes (MWCNTs), etc.

The foregoing general description of the illustrative embodiments and the following detailed description thereof are merely exemplary aspects of the teachings of this disclosure and are not restrictive. Additional aspects will be appreciated by those having ordinary skill in the art upon reading the present disclosure in view of the various figures.

BRIEF DESCRIPTION OF FIGURES

Non-limiting and non-exhaustive examples are described with reference to the following figures.

DETAILED DESCRIPTION

The following description sets forth exemplary aspects of the present disclosure. It should be recognized, however, that such description is not intended as a limitation on the scope of the present disclosure. Rather, the description also encompasses combinations and modifications to those exemplary aspects described herein.

The present disclosure relates to methods for oxidizing carbonaceous materials. In particular, the disclosure provides a microwave-assisted process for achieving homogeneous and reproducible oxidation of carbon.

In some aspects, the method involves combining carbon with a mild oxidizer, a base, and a solvent to obtain a mixture. The mixture may then be exposed to microwave radiation for a predetermined time to produce oxidized carbon. The resulting oxidized carbon may have a homogeneous distribution of oxygen content and a reproducible degree of oxidation.

In certain implementations, hydrogen peroxide may be used as the mild oxidizer. Ammonium hydroxide may serve as the base in some cases. Water or a cosolvent system including water may be employed as the solvent. The microwave exposure time may be relatively short, such as about 15 minutes in some instances.

The disclosed method may offer several potential advantages. The single-step process may be simpler and faster compared to traditional multi-step oxidation techniques. Use of mild, degradable reagents may reduce hazardous waste and simplify cleanup procedures. The microwave heating may allow for more uniform and rapid temperature control throughout the reaction mixture.

In some embodiments, the oxidized carbon product may exhibit a surface oxygen content in the range of a nonzero amount to about 10 at %, preferably in a range from about 4 at % to about 7 at %, although any amount in the broad range of a nonzero amount to about 10 at %, such as about 0.01 at %, about 0.05 at %, about 1.0 at %, about 1.25 at %, about 1.33 at %, about 1.5 at %, about 1.66 at %, about 1.75 at %, about 2.0 at %, about 2.25 at %, about 2.33 at %, about 2.5 at %, about 2.66 at %, about 2.75 at %, about 3.0 at %, about 3.25 at %, about 3.33 at %, about 3.5 at %, about 3.66 at %, about 3.75 at %, about 4.0 at %, about 4.25 at %, about 4.33 at %, about 4.5 at %, about 4.66 at %, about 4.75 at %, about 5.0 at %, about 5.25 at %, about 5.33 at %, about 5.5 at %, about 5.66 at %, about 5.75 at %, about 6.0 at %, about 6.25 at %, about 6.33 at %, about 6.5 at %, about 6.66 at %, about 6.75 at %, about 7.0 at %, about 7.25 at %, about 7.33 at %, about 7.5 at %, about 7.66 at %, about 7.75 at %, about 8.0 at %, about 8.25 at %, about 8.33 at %, about 8.5 at %, about 8.66 at %, about 8.75 at %, about 9.0 at %, about 9.25 at %, about 9.33 at %, about 9.5 at %, about 9.66 at %, about 9.75 at %, about 9.9 at %, about 10.0 at %, or any value or range of values therebetween may be achieved without departing from the scope of the inventive concepts presented herein. According to several experimental examples, shown in FIG. 2A and described in greater detail hereinbelow, surface oxygen content was observed to be in a range from about 4.08 at % to about 4.81 at %.

The standard deviation of the surface oxygen content may be less than about 0.5% in certain cases, indicating a high degree of homogeneity and reproducibility. For instance, according to various approaches, the standard deviation of oxygen content may be in a range from about 0.01 at % to about 1.0 at %, such as about 0.01 at %, about 0.02 at %, about 0.03 at %, about 0.05 at %, about 0.066 at %, about 0.075 at %, about 0.09 at %, about 0.1 at %, about 0.125 at %, about 0.133 at %, about 0.15 at %, about 0.166 at %, about 0.175 at %, about 0.2 at %, about 0.25 at %, about 0.33 at %, about 0.5 at %, about 0.66 at %, about 0.75 at %, about 0.9 at %, about 0.99 at %, about 1.0 at %, or any value or range of values in the broad range from about 0.01 to about 1.0 at %, according to various implementations. In particularly preferred approaches, as determined experimentally and shown below in Table 1, the standard deviation of surface oxygen content may be about 0.31 at %.

Correspondingly, a coefficient of variance of surface oxygen content may be in a range from about 1 at % to about 10 at %, such as about 1.0 at %, about 1.25 at %, about 1.33 at %, about 1.5 at %, about 1.66 at %, about 1.75 at %, about 2.0 at %, about 2.25 at %, about 2.33 at %, about 2.5 at %, about 2.66 at %, about 2.75 at %, about 3.0 at %, about 3.25 at %, about 3.33 at %, about 3.5 at %, about 3.66 at %, about 3.75 at %, about 4.0 at %, about 4.25 at %, about 4.33 at %, about 4.5 at %, about 4.66 at %, about 4.75 at %, about 5.0 at %, about 5.25 at %, about 5.33 at %, about 5.5 at %, about 5.66 at %, about 5.75 at %, about 6.0 at %, about 6.25 at %, about 6.33 at %, about 6.5 at %, about 6.66 at %, about 6.75 at %, about 7.0 at %, about 7.25 at %, about 7.33 at %, about 7.5 at %, about 7.66 at %, about 7.75 at %, about 8.0 at %, about 8.25 at %, about 8.33 at %, about 8.5 at %, about 8.66 at %, about 8.75 at %, about 9.0 at %, about 9.25 at %, about 9.33 at %, about 9.5 at %, about 9.66 at %, about 9.75 at %, about 9.9 at %, about 10.0 at %, or any value or range of values therebetween, with a characteristic value determined experimentally being about 6.8 at %.

Partially oxidized carbonaceous materials produced according to the presently described inventive concepts may be characterized by a crystalline structure having an average crystallite size in a range from about 10 nm to about 30 nm. For instance, according to various implementations, the average crystallite size may be about 10 nm, about 11 nm, about 12 nm, about 13 nm, about 14 nm, about 15 nm, about 16 nm, about 17 nm, about 18 nm, about 19 nm, about 20 nm, about 21 nm, about 22 nm, about 23 nm, about 24 nm, about 25 nm, about 26 nm, about 27 nm, about 28 nm, about 29 nm, about 30 nm, or any value or range of values therebetween.

The method may be applicable to various types of carbonaceous materials. In some implementations, the starting carbon may be selected from graphene, three-dimensional graphene, carbon nano-onions (CNOs), graphene flakes, graphene platelets, carbon fibers, carbon flakes, fullerenes, carbon nanotubes (CNTs), single walled carbon nanotubes (SWCNTs), multi walled carbon nanotubes (MWCNTs), and combinations thereof, or other suitable obtains. Carbon allotropes produced using the presently described inventive techniques may allotropes partially oxidized versions of these starting carbonaceous materials.

Oxidized carbonaceous materials produced by the disclosed method may find utility in a range of applications. These may include, but are not limited to, sensors, composites, energy storage devices, and catalysts. The homogeneous and reproducible nature of the oxidation may allow for more consistent performance in such applications.

For example, oxygenation facilitates further functionalization of the carbon, facilitating addition of tailored functional groups specific to particular applications. In addition, partially oxidized graphene may have additional utility in obtaining composite materials. Moreover still, oxidized graphene has better solubility, dispersibility, etc. than conventional graphene.

In one aspect, the carbonaceous material may be characterized by a base resistance of at least about 200 Ohms, and may be characterized by a response sensitivity to specific gaseous species (including various oxides of sulfur, nitrogen, carbon, etc. such as sulfur dioxide, sulfur trioxide, nitrous oxide, nitrogen dioxide, carbon monoxide, carbon dioxide, etc.). For example, the response sensitivity may be at about 1 ppm or less. The response may comprise an alternating current response, in select implementations.

According to various aspects, partially oxidized carbonaceous materials may be functionalized to facilitate utility in various applications or chemistries. For instance, partially oxidized carbonaceous materials may include functional groups such as carbonyl groups, carboxyl groups, ether groups, ester groups, aldehyde groups, ketone groups, hydroxyl groups, epoxide groups, and combinations thereof. Preferably, the functional groups include oxygen atoms that were incorporated into the starting carbonaceous material using the presently described inventive procedures.

Figure 1:
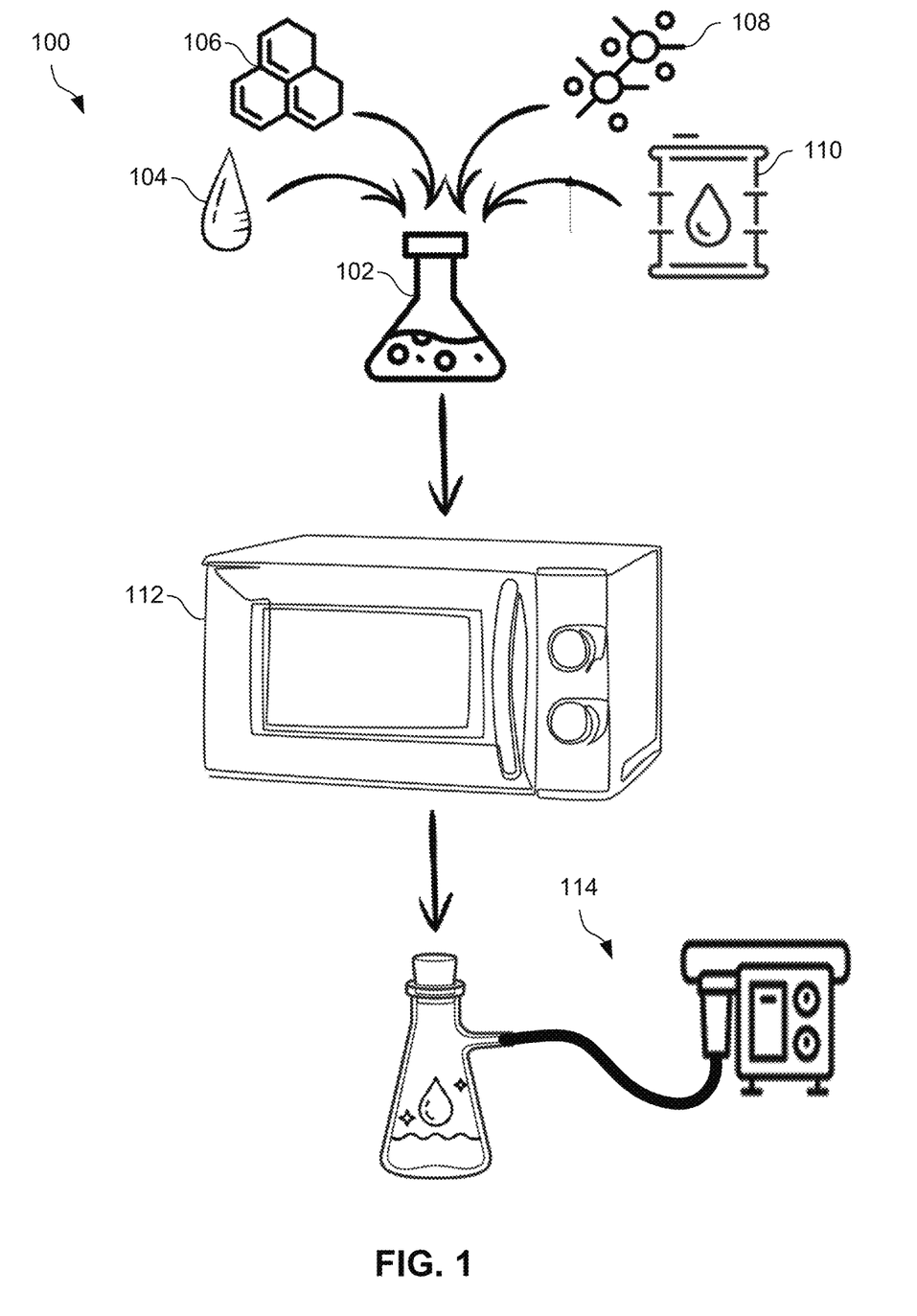
FIG. 1 is a simplified schematic of a system for producing and collecting microwave-assisted, partially oxidized carbon, according to aspects of the present disclosure.

Referring to FIG. 1, a system 100 for microwave-assisted carbon oxidation is illustrated. The system may include a reaction vessel 102 containing a mixture of carbonaceous material 106, a base/nucleophile 104, an oxidizer 108, and a solvent 110 (optionally including one or more cosolvents, such as water miscible green solvents that are polar protic and/or polar aprotic solvents, such as ethanol, isopropanol, acetone, acetonitrile, etc. In some aspects, the base/nucleophile may be ammonium hydroxide. The oxidizer may be hydrogen peroxide in certain implementations. Water may serve as the solvent in some cases, and the solvent system may include one or more cosolvents as described above.

The reaction vessel 102 containing the mixture may be placed in a microwave oven 112. In some embodiments, the microwave oven may operate at a power in a range from about 100 W to about 1700 W, depending on the amount and type of carbonaceous material. For example, the power may be about 100 W, about 125 W, about 133 W, about 150 W, about 166 W, about 175 W, about 200 W, about 225 W, about 250 W, about 275 W, about 300 W, about 333 W, about 350 W, about 375 W, about 499 W, about 425 W, about 459 W, about 475 W, about 500 W, about 550 W, about 600 W, about 666 W, about 750 W, about 800 W, about 900 W, about 1000 W, about 1100 W, about 1250 W, about 1333 W, about 1500 W, about 1666 W, about 1700 W, or any value therebetween, without departing from the scope of the presently described inventive concepts.

The total reaction time for the microwave-assisted oxidation process may be relatively short compared to traditional oxidation methods. This shorter reaction time may offer advantages in terms of process efficiency and throughput. However, the duration of microwave exposure may be varied to achieve different degrees of oxidation or to accommodate different types of carbonaceous materials.

For instance, the microwave treatment may be applied for a predetermined time period in a range from about 5 seconds to about 2 hours. In preferred approaches, microwave treatment may be applied for approximately 15 minutes in certain cases. However, the power level and treatment duration may be adjusted based on factors such as the type and quantity of carbonaceous material, desired degree of oxidation, and other process parameters. For instance, the carbonaceous material may be exposed to microwave energy for a duration of about 5 seconds, about 10 seconds, about 30 seconds, about 45 seconds, about 1 minute, about 2.5 minutes, about 3.33 minutes, about 5 minutes, about 6.66 minutes, about 7.5 minutes, about 10 minutes, about 15 minutes, about 20 minutes, about 25 minutes, about 30 minutes, about 45 minutes, about 1 hour, about 1.25 hours, about 1.5 hours, about 1.75 hours, about 2 hours, or any duration therebetween without departing from the scope of the inventive concepts described herein.

Following the microwave treatment, the oxidized carbon product may undergo post-treatment steps. In some implementations, these steps may include centrifugation, vacuum filtration etc. to separate the oxidized carbon from the reaction mixture. The filtered carbon may then be washed (e.g., with water) and/or collected for further analysis or use in various applications.

The system may allow for a simplified, efficient method of carbon oxidation. By utilizing microwave energy, the process may achieve more rapid and uniform heating compared to conventional thermal methods. The use of mild, degradable reagents such as water, alcohol(s), ammonium hydroxide and hydrogen peroxide may offer advantages in terms of safety and environmental impact. Additionally, the single-step nature of the microwave treatment may reduce processing time and complexity compared to traditional multi-step oxidation techniques.

Referring again to FIG. 1, the microwave treatment may be carried out using a system 100 including a household microwave oven 112, in some implementations. The microwave oven may operate at a power of approximately 900 W in certain aspects. However, the power level may be adjusted based on factors such as the type and quantity of carbonaceous material, desired degree of oxidation, and other process parameters.

Following the microwave treatment, the oxidized carbon product may undergo post-treatment steps to isolate and purify the material. In some aspects, washing and/or filtration may be employed, e.g. using a vacuum filtration apparatus 114 as shown in FIG. 1 and/or a centrifuge (not shown). The vacuum filtration apparatus may include any known suitable components, such as a vacuum filtration flask and vacuum pump as shown in FIG. 1. Washing and filtration may be employed to separate the oxidized carbon from the reaction mixture. The vacuum filtration process may allow for efficient removal of liquid components while retaining the solid oxidized carbon product.

The filtered carbon may then be collected for further analysis or use in various applications. Additional washing or drying steps may be performed as needed to prepare the oxidized carbon for specific end uses. The simplicity of this post-treatment process, facilitated by the use of degradable reagents, may offer advantages in terms of reduced processing time and minimized waste generation compared to traditional oxidation methods.

Figure 2A:
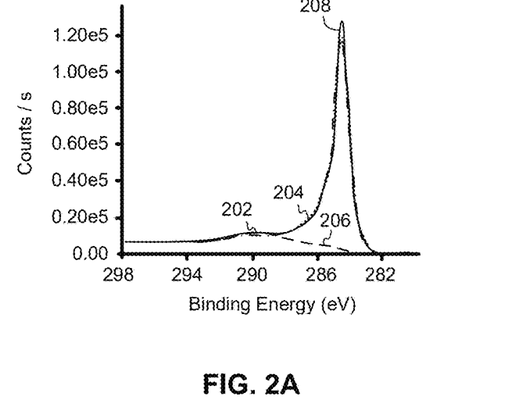
FIG. 2A is a graph depicting X-ray photoelectron spectroscopy (XPS) data for several embodiments of partially oxidized carbonaceous materials obtained according to the presently disclosed inventive concepts.

Referring to FIG. 2A, data from X-ray photoelectron spectroscopy (XPS) analysis of the oxidized carbon samples may be presented. The XPS data display 3-point survey averages with high-resolution C1s spectra. These graphs may demonstrate the consistent oxidation achieved across different samples using the microwave-assisted process.

In some aspects, the microwave-assisted carbon oxidation process may achieve approximately 4.5% surface oxygen oxidation. This level of oxidation may be achieved homogeneously across the carbon surface. The variability in the oxidation process may be less than 6% in certain implementations, indicating a high degree of reproducibility.

Moreover, the various curves 202, 204, 206, and 208 shown in FIG. 2A indicate the presence of different bonding types within the partially oxidized carbonaceous material. In particular, curve 202 (dash-dot-dashed line) indicates presence of carbonyl groups (O—C=O bonds); curve 204 (dotted line) indicates presence of ether linkages (C—O—C bonds); curve 206 (dashed line) indicates presence of carbon-carbon plasmons (C—C); while curve 208 (solid line) indicates presence of carbon-carbon single bonds (C—C).

The batch-to-batch consistency of the oxidation process are summarized in Table 1. In particular, Table 1 shows data indicating oxygen atomic percentages and standard deviations for multiple batches of oxidized carbon samples. The consistent oxidation amounts and low standard deviations observed demonstrate the extremely homogenous (substantially uniform) distribution of oxygen, and a high level of reproducibility in the oxidation process across different batches.

TABLE 1

XPS Oxygen Content and Homogeneity Data

| Batch ID | Oxygen Content (at %) | Oxygen Content STD DEV (at %) |
|---|---|---|
| 1 | 4.71 | 0.29 |
| 2 | 4.08 | 0.24 |
| 3 | 4.81 | 0.39 |

Figure 2B:
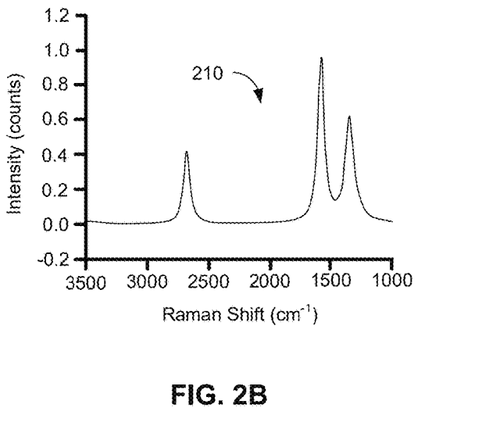
FIG. 2B is a graph depicting fit Raman spectroscopy data for several embodiments of partially oxidized carbonaceous materials obtained according to the presently disclosed inventive concepts.

The graph shown in FIG. 2B provides quantitative information on the reproducible crystallinity and tortuosity of the oxidized carbon, as measured by Raman spectroscopy. Table 2 includes representative values derived from the data shown in FIG. 2B for La (crystallite size), La standard deviation, Rtor (carbon tortuosity), and Rtor standard deviation for multiple batches of partially oxidized carbonaceous materials produced according to the inventive concepts presented herein. The consistency in these values across batches further demonstrates the reproducibility of the microwave-assisted oxidation process. Curve 210 as shown in FIG. 2B represents a total fit of the overall Raman data collected in these experiments.

TABLE 2

Raman Spectroscopy Crystallinity and Tortuosity Data

| Batch ID | La (nm) | La STD DEV (nm) | Rtor (carbon tortuosity) | Rtor STD DEV |
|---|---|---|---|---|
| 1 | 19 | 0.9 | 0.78 | 0.08 |
| 2 | 20 | 2.1 | 0.88 | 0.14 |
| 3 | 17 | 1.8 | 0.66 | 0.12 |

La values indicate the degree of crystallinity in the oxidized carbon samples. Higher La values suggest larger crystallite sizes and potentially more ordered carbon structures. The Rtor values provide information on the tortuosity or complexity of the carbon structure. The low standard deviations in both La and Rtor values across batches indicates a high degree of consistency in the structural properties of the oxidized carbon produced by the microwave-assisted process.

The combination of XPS and Raman spectroscopy data presented in FIGS. 2A-2B provide comprehensive evidence of the homogeneity and reproducibility achieved through the microwave-assisted carbon oxidation process. These analytical techniques may offer complementary information on both the surface chemistry and structural characteristics of the oxidized carbon samples.

The microwave-assisted oxidation process may be applied to various types of carbonaceous materials. In some aspects, 3D graphene may be used as the starting carbonaceous material. The three-dimensional structure of 3D graphene may provide a high surface area for oxidation, potentially leading to enhanced reactivity and functionality in the resulting oxidized product.

In certain implementations, carbon nano-onions (CNOs) may serve as the carbonaceous material for oxidation. CNOs may offer unique properties due to their concentric spherical structure, which may influence the oxidation process and the characteristics of the final partially oxidized carbon.

Microwave flake carbon may also be suitable for the disclosed oxidation method in some cases. The flake morphology may allow for efficient interaction with the microwave radiation and reagents, potentially facilitating uniform oxidation across the material.

The oxidized carbon products resulting from the microwave-assisted process may find utility in various applications. In some aspects, the partially oxidized carbonaceous materials may be incorporated into sensors. The controlled and reproducible surface oxidation may enhance the sensitivity and selectivity of these sensors towards specific analytes. For example, the oxidized carbon may exhibit improved response to gases compared to non-oxidized counterparts.

Composites represent another potential application area for the oxidized carbonaceous materials. In certain implementations, the oxidized carbon may be integrated into polymer matrices to obtain composite materials with enhanced properties. The oxygen-containing functional groups on the carbon surface may promote better interfacial interactions with the polymer, potentially leading to improved mechanical, thermal, or electrical characteristics of the composite.

The versatility of the microwave-assisted oxidation process may allow for tailoring the degree and nature of oxidation to suit specific application requirements. By adjusting parameters such as microwave power, exposure time, or reagent concentrations, the oxidation characteristics may be fine-tuned for optimal performance in sensors, composites, or other potential applications.

Figure 3:
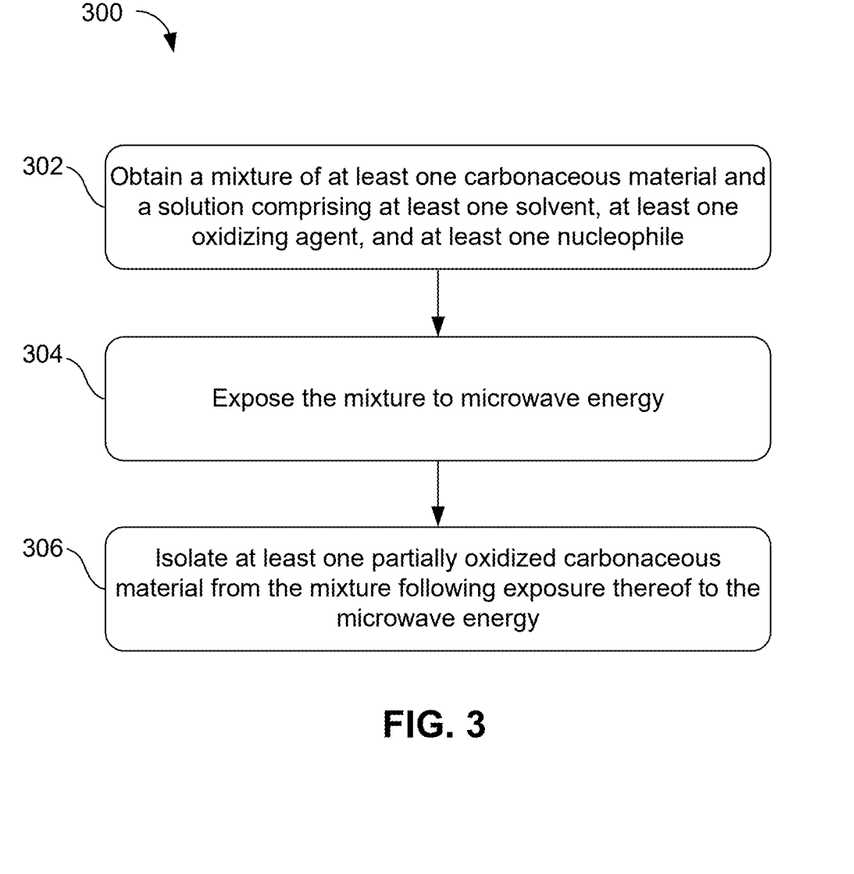
FIG. 3 is a flowchart of a method for producing and collecting microwave-assisted, partially oxidized carbonaceous materials, according to aspects of the present disclosure.

Referring now to FIG. 3, a flowchart of an illustrative method 300 for homogenously, partially oxidizing carbonaceous material is shown, according to one embodiment.

As shown in FIG. 3, the method 300 includes operation 302, where a mixture of at least one carbonaceous material and a solution comprising at least one solvent, at least one oxidizing agent, and at least one nucleophile is obtained. The mixture may be obtained using any suitable technique, such as by combining the constituent ingredients in a suitable vessel, e.g. a beaker or flask, and stirring, vortexing, sonicating, etc. the contents until uniformly mixed.

In operation 304 of method 300, the mixture is exposed to microwave energy. While any type of microwave energy produced by any microwave source may be employed, in preferred embodiments the microwave energy is provided by a conventional household microwave. Skilled artisans will appreciate that the exposing partially oxidizes one or more surfaces of the at least one carbonaceous material. In select embodiments, a bulk of the partially oxidized carbonaceous material may remain substantially devoid of oxygen, and oxygen may penetrate the one or more surface(s) of the partially oxidized carbonaceous material to a depth in a range from 0.3 nm to about 3 nm, e.g., about 0.3 nm, about 0.6 nm, about 0.9 nm, about 1.2 nm, about 1.5 nm, about 1.8 nm, about 2.1 nm, about 2.4 nm, about 2.7 nm, about 3.0 nm, or any value therebetween. Skilled artisans will appreciate that this depth range corresponds to from about 1 to about 10 layers of graphene including oxygen.

With continuing reference to FIG. 3, operation 306 of method 300 involves isolating at least one partially oxidized carbonaceous material from remnants of the reaction mixture, which may include unreacted components, and/or other reacted components not of interest in the context of the present disclosure.

Of course, in various approaches method 300 may include any number of alternative or additional features, operations, characteristics, etc. as described herein, as well as suitable equivalents thereof that would be appreciated by those having ordinary skill in the art upon reading the present disclosure.

For instance, in various approaches, isolating the at least one partially oxidized carbonaceous material may include centrifuging and/or filtering the mixture following exposure thereof to the microwave energy. Filtration may be performed using any suitable technique and apparatus, such as filter paper, a separation column, etc. but in preferred approaches filtration is performed using vacuum filtration and any suitable vacuum filtration apparatus, e.g., a vacuum filtration flask and vacuum pump as shown in FIG. 1. Additionally or alternatively, in some approaches operation 306 may involve washing the partially oxidized carbonaceous material before and/or after centrifugation and/or filtration. Further still, the centrifugation, filtration and/or washing steps may be repeated any number of times until the carbonaceous material is desirably pure. Washing may be performed, in one approach, using water or any other suitable fluid that would be understood by skilled artisans having read the present descriptions.

Moreover, the solution is preferably an aqueous solution, and the at least one solvent may include water and/or one or more water miscible green cosolvents that are polar protic and/or polar aprotic solvents, such as ethanol, isopropanol, acetone, acetonitrile, etc., and combinations thereof.

The starting carbonaceous materials, and/or partially oxidized carbonaceous materials, may include one or more carbon allotropes such as graphene, three-dimensional graphene, carbon nano-onions (CNOs), graphene flakes, graphene platelets, carbon fibers, fullerenes, carbon nanotubes (CNTs), single walled carbon nanotubes (SWCNTs), multi walled carbon nanotubes (MWCNTs), and combinations thereof.

In more approaches, the nucleophile preferably is a base. Particularly preferably, the nucleophile comprises ammonium hydroxide, ozone, or a combination thereof.

The solution preferably excludes conventional reagents used in traditional wet oxidation methods, such as nitric acid, sulfuric acid, potassium permanganate, sodium nitrite, sodium chlorate, and combinations thereof.

By implementing the presently described reagents for partial oxidation of carbonaceous materials, the inventive techniques disclosed herein advantageously do not produce any environmentally harmful substances as byproducts. The byproducts produced may include water (liquid and/or vapor), ammonia, and/or oxygen, in various approaches. This advantage inures from choosing reagents that decompose into the aforementioned byproducts rather than reagents that include metals, strong acids, etc. as in traditional wet oxidation techniques.

As noted above, in accordance with various embodiments of method 300, exposing the carbonaceous material(s) to microwave energy may be performed at a power in a range from about 100 W to about 1700 W, depending on the type and quantity of input material and desired partially oxidized material, as well as exposure time, which may be in a range from about 5 seconds to about 2 hours.

While method 300 as shown in FIG. 3 includes three operations, it shall be understood that in alternative embodiments the presently described inventive techniques may be considered a "singlestep" method for partially oxidizing carbon. According to such approaches, the single, critical step is exposing the mixture of reagents to microwave energy at a power level and for a duration as described herein. For example, pre-made mixtures may simply be exposed to microwave energy as described herein, producing partially oxidized carbonaceous materials having characteristics as disclosed above.

By implementing inventive, microwave-assisted partial oxidation techniques such as shown in FIG. 3 and described herein, it is possible to enable reproducible, substantially homogenous partial oxidation of surface(s) of carbonaceous materials, which advantageously facilitates utility thereof in various applications, as well as functionalization thereof for subsequent use in various applications. Accordingly, carbonaceous materials produced according to method 300, as well as variations thereof described herein and equivalents thereof that would be understood by those having ordinary skill in the art upon reading the present disclosure, have exemplary characteristics as set forth above, in any combination, without departing from the scope of these inventive concepts.

A number of implementations have been described. Nevertheless, it will be understood that various modifications may be made without departing from the spirit and scope of the disclosure. Accordingly, other implementations are within the scope of the following claims.

The invention claimed is:

1. A method, comprising:
    obtaining a mixture of at least one carbonaceous material and a solution comprising at least one solvent, at least one oxidizing agent, and at least one nucleophile;
    exposing the mixture to microwave energy; and
    isolating at least one partially oxidized carbonaceous material from the mixture following exposure thereof to the microwave energy.

2. The method as recited in claim 1, wherein the at least one carbonaceous material in the mixture comprises one or more carbon allotropes selected from the group consisting of: graphene, three-dimensional graphene, carbon nano-onions (CNOs), graphene flakes, graphene platelets, carbon fibers, fullerenes, carbon nanotubes (CNTs), single walled carbon nanotubes (SWCNTs), multi walled carbon nanotubes (MWCNTs), and combinations thereof.

3. The method as recited in claim 1, wherein the solution is an aqueous solution, and wherein the at least one solvent comprises water.

4. The method as recited in claim 3, wherein at least one solvent further comprises one or more water miscible green solvents.

5. The method as recited in claim 4, wherein the one or more water miscible green solvents are selected from the group consisting of polar protic solvents, polar aprotic solvents, and any combination thereof.

6. The method as recited in claim 1, wherein the at least one nucleophile is a base.

7. The method as recited in claim 1, wherein the at least one nucleophile comprises ammonium hydroxide, ozone, or a combination thereof.

8. The method as recited in claim 1, wherein the solution excludes substances selected from the group consisting of: nitric acid, sulfuric acid, potassium permanganate, sodium nitrite, sodium chlorate, and combinations thereof.

9. The method as recited in claim 1, wherein the microwave energy is characterized by a power in a range from about 100 W to about 1700 W.

10. The method as recited in claim 1, wherein the exposing is performed for a duration of about 5 seconds to about 2 hours.

11. The method as recited in claim 1, wherein the isolating comprises either:
    centrifuging the at least one partially oxidized carbonaceous material;
    filtering the at least one partially oxidized carbonaceous material;
    washing the at least one partially oxidized carbonaceous material; or
    any combination thereof.

12. The method as recited in claim 1, wherein the at least one partially oxidized carbonaceous material comprises, after isolation thereof, one or more carbon allotropes selected from the group consisting of: graphene, three-dimensional graphene, carbon nano-onions (CNOs), graphene flakes, graphene platelets, carbon fibers, fullerenes, carbon nanotubes (CNTs), single walled carbon nanotubes (SWCNTs), multi walled carbon nanotubes (MWCNTs), and combinations thereof.

13. The method as recited in claim 1, wherein one or more surfaces of the at least one partially oxidized carbonaceous material are characterized by a substantially homogenous distribution of oxygen therein.

14. The method as recited in claim 13, wherein the substantially homogenous distribution of oxygen is characterized by a standard deviation of oxygen content of about 1% or less.

15. The method as recited in claim 1, wherein one or more surfaces of the at least one carbonaceous material are partially oxidized, wherein the one or more partially oxidized surfaces of the at least one carbonaceous material contain oxygen in a nonzero amount up to about 10 at %.

16. The method as recited in claim 1, wherein at least some oxygen present in the at least one partially oxidized carbonaceous material is present in the form of one or more functional groups selected from the group consisting of: carbonyl groups, carboxyl groups, ether groups, ester groups, aldehyde groups, ketone groups, hydroxyl groups, epoxide groups, and combinations thereof.

* * * * *